June 4, 1963
J. DOLZA
3,092,089
INTERNAL COMBUSTION ENGINES
Filed Aug. 1, 1960
5 Sheets-Sheet 1
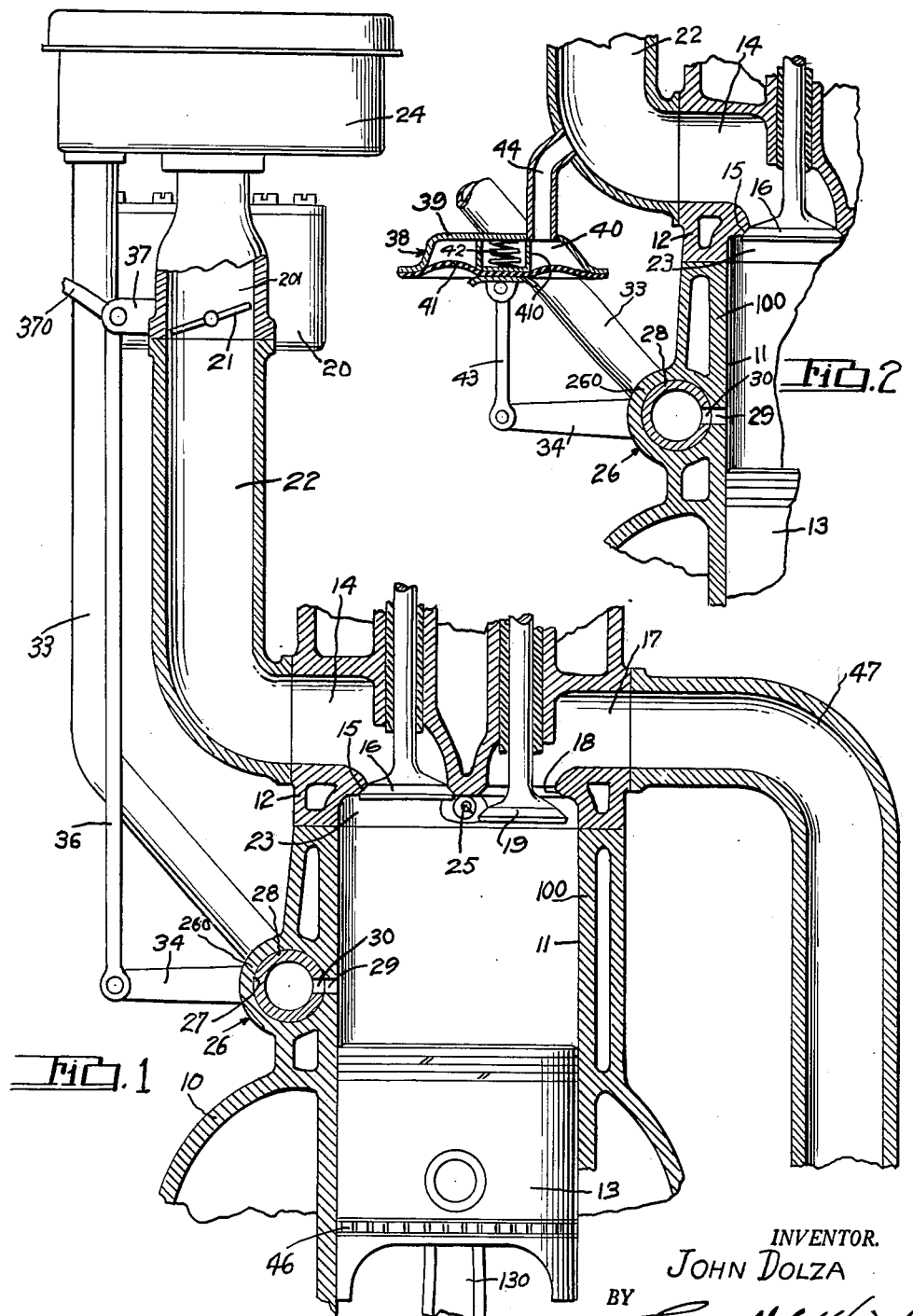
INVENTOR.
JOHN DOLZA
BY
ATTORNEY

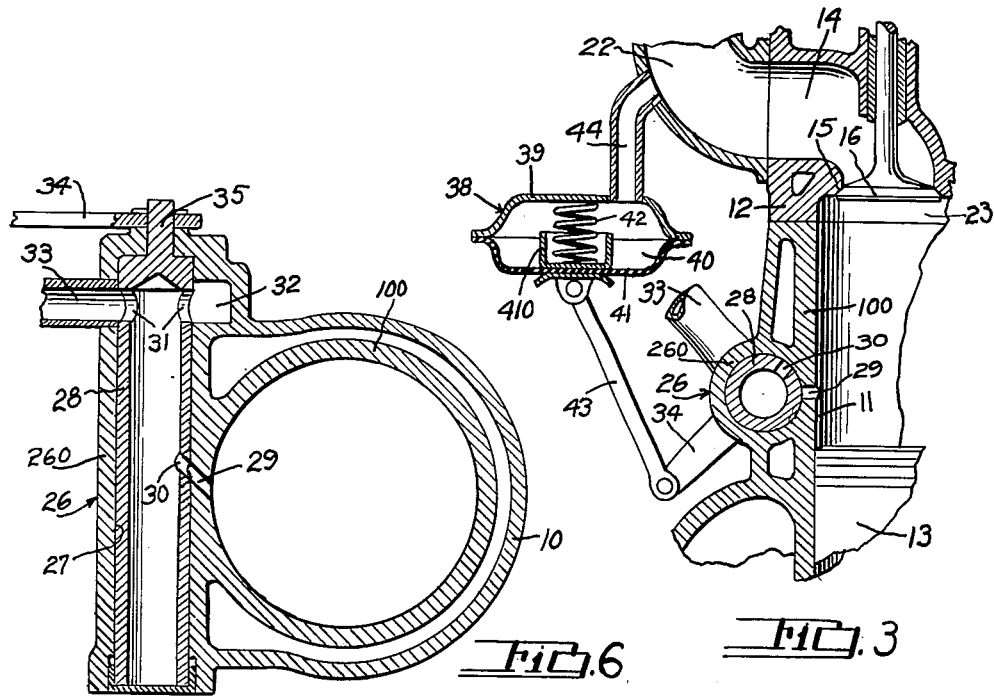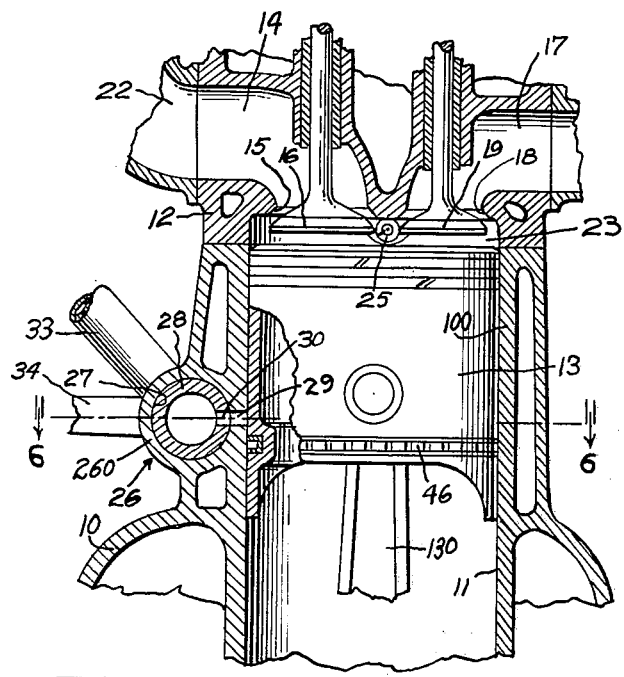

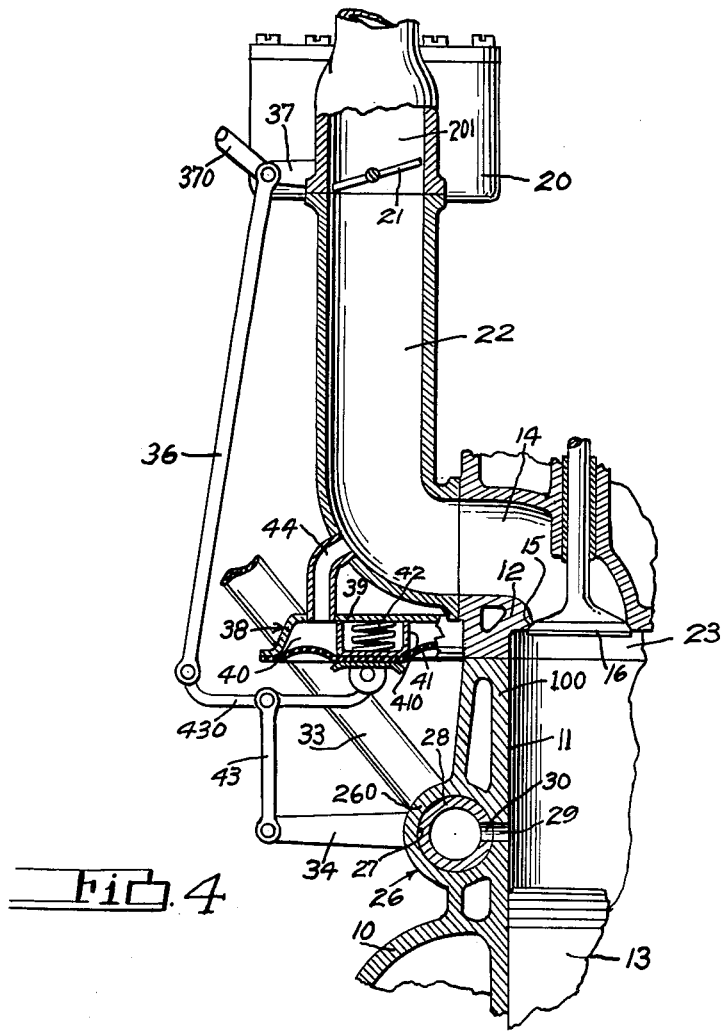

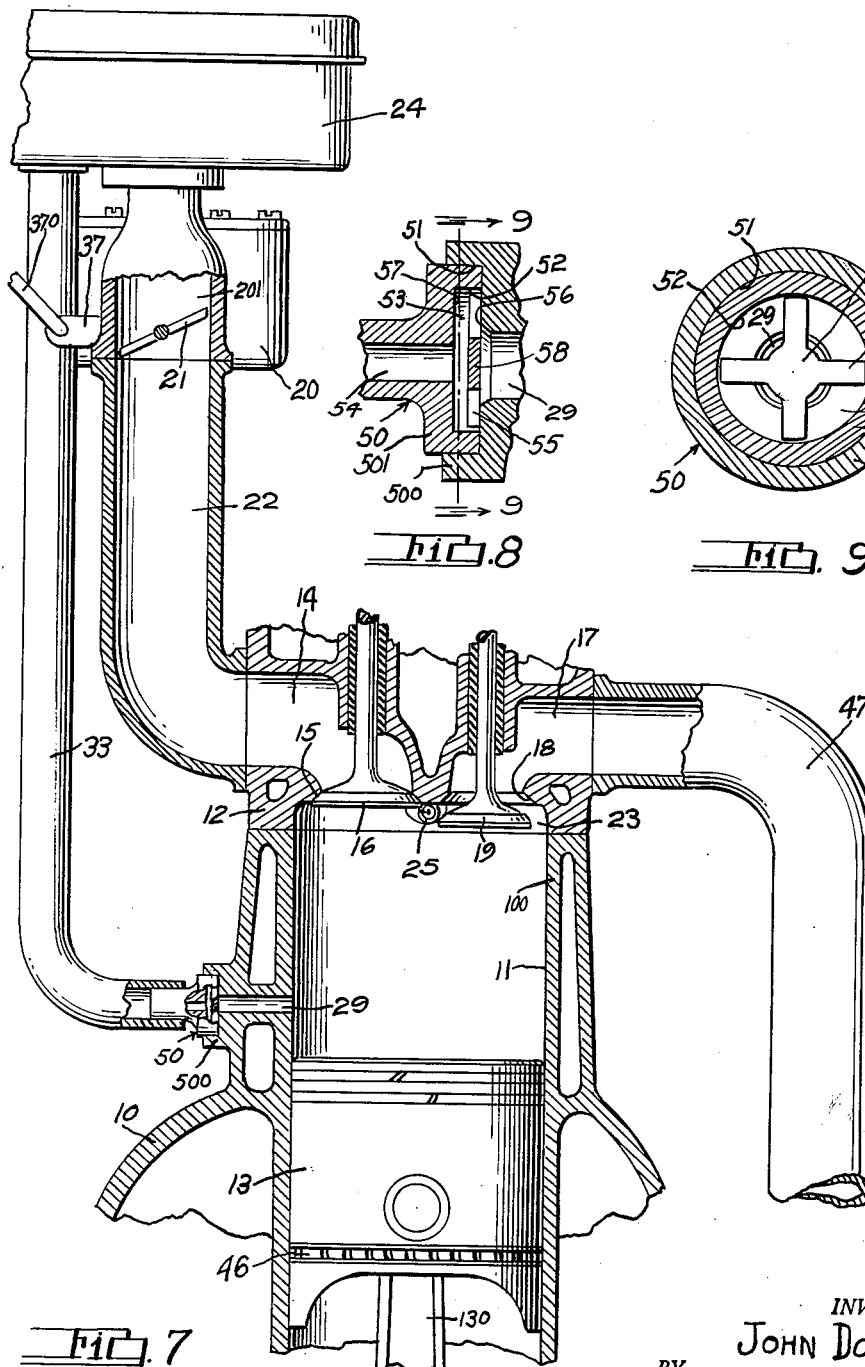

United States Patent Office 3,092,089
Patented June 4, 1963

3,092,089
INTERNAL COMBUSTION ENGINES
John Dolza, 15080 Fenton Road, Fenton, Mich.
Filed Aug. 1, 1960, Ser. No. 46,721
2 Claims. (Cl. 123—76)

This invention relates to four-cycle internal combustion engines and more particularly to improved, simple and effective means for scavenging exhaust gases from the cylinders thereof whereby residual exhaust gases in the cylinders is removed at the proper time and replaced by a charge of fresh air and air-fuel mixture whereby to assure substantially complete combustion of the air-fuel mixture, thereby resulting in the presence of a minimum of harmful gases and noxious odors in the engine exhaust, all while improving power output of the engine.

In conventional engines, at idle, near idle and coasting, the exhaust contains large amounts of carbon monoxide and hydro-carbons due to the introduction of rather small charges of air-fuel mixture in relation to the large amount of residual exhaust gases in the combustion chamber.

In the instant invention, combustion at idle, near idle and coasting is improved by replacing with air a major portion or substantially all of the residual exhaust gases within the cylinder after the expansion stroke so that the air-fuel mixture in the combustion chamber at the beginning of the intake stroke is as required for proper combustion, thus a more complete combustion of the air-fuel mixture will take place when ignited near the end of the compression stroke. When the engine throttle is open beyond idle or near idle or is at wide open throttle, the usual air-fuel mixture at or near stoichiometric value selected by proper carburetor setting produces good combustion substantially free from unburned fuel; therefore, at normal open throttle engine speeds, no serious problem of the presence of harmful gases or noxious odors in the engine exhaust exists.

With the foregoing in view, the primary object of this invention is to provide in a four-cycle spark ignited internal combustion engine an improved method and means for scavenging exhaust gases from the cylinders thereof when the engine is operating at engine idle and near idle throttle, and responsive to such throttle settings.

Another object of the invention is to provide an improved four-cycle internal combustion engine in which the exhaust gases are substantially removed by the introduction of fresh air into the cylinders near the end of the intake stroke and the beginning of the compression stroke, and, near the end of the expansion stroke and the beginning of the exhaust stroke through an aperture in each cylinder wall, and to provide improved control means operable responsive to the engine carburetor throttle valve positioning for regulating the amount and timing of the said air introduction.

Another object of the invention is to introduce scavenging air into the cylinders of a four-cycle internal combustion engine by scavenging valve means operative responsive to idle or near idle throttle positioning of the engine carburetor butterfly valve and/or wholly or partially by the intake manifold pressure at such throttle positions, the said scavenging air forming itself generally into a layer just above the piston when the said piston is below the scavening air port and when said scavenging valve is open.

A further object of the invention is to arrange the valve timing of a four-cycle internal combustion engine in such a manner that the exhaust valve is slightly open and the intake valve is also slightly open near the end of the piston exhaust stroke and at the beginning of its intake stroke; that is, both valves are slightly open at the aforementioned piston positions simultaneously only to an extent that the backflow of exhaust into the intake system is not sufficiently great to interfere with substantially complete combustion.

It is also an object of the invention to create, in a four-cycle internal combustion engine a sufficient sub-atmospheric pressure condition in the combustion chamber near the end of the expansion stroke and the beginning of the exhaust stroke by providing an extended tubular exhaust pipe from the exhaust ports wherein the exhaust gases moving at high speed develop sufficient kinetic energy to draw fresh air charges into the cylinders through a valved scavenging port or ports opened responsive to the engine throttle being at idle or near idle and/or by the intake manifold pressure (depression) created when the engine throttle is at such positions.

A further object of the invention is to provide, in a four-cycle internal combustion engine, means for scavenging of the combustion chambers thereof employing scavenging valve means at each cylinder openable responsive to sub-atmospheric pressures developed within the said combustion chambers, the said valve means closing responsive to combustion chamber pressures above atmospheric.

Other objects and advantages of the invention will be more fully understood by reference to the following detailed description taken in connection with the accompanying drawings, in which:

FIG. 1 is a fragmentary vertical transverse sectional view through a single cylinder four-cycle engine embodying the invention including a scavenging air valve operated solely by the engine throttle.

FIG. 2 is a fragmentary sectional view of the said engine showing a modified form of control for the scavenging air valve which is controlled solely by engine intake manifold pressure, the scavening air valve being shown in its open position.

FIG. 3 is a fragmentary sectional view corresponding to FIG. 2 showing the scavening air valve closed.

FIG. 4 is a fragmentary sectional view of the said engine showing the scavenging air valve operated by the engine throttle modified by intake manifold pressure.

FIG. 5 is a fragmentary cross sectional view showing a piston oil scraper ring located on the piston for disposition always below the scavenging air port in the cylinder wall.

FIG. 6 is a cross sectional view taken on line 6—6 of FIG. 5, the piston being omitted.

FIG. 7 is a fragmentary sectional view of said engine showing a further modified form of scavenging air control including an air flow type scavenging air valve, said valve being shown in its open position.

FIG. 8 is an enlarged cross sectional view of the scavenging valve construction employed in the embodiment of the invention disclosed in FIG. 7.

FIG. 9 is a cross sectional view taken on line 9—9 of FIG. 8.

Figure 10:
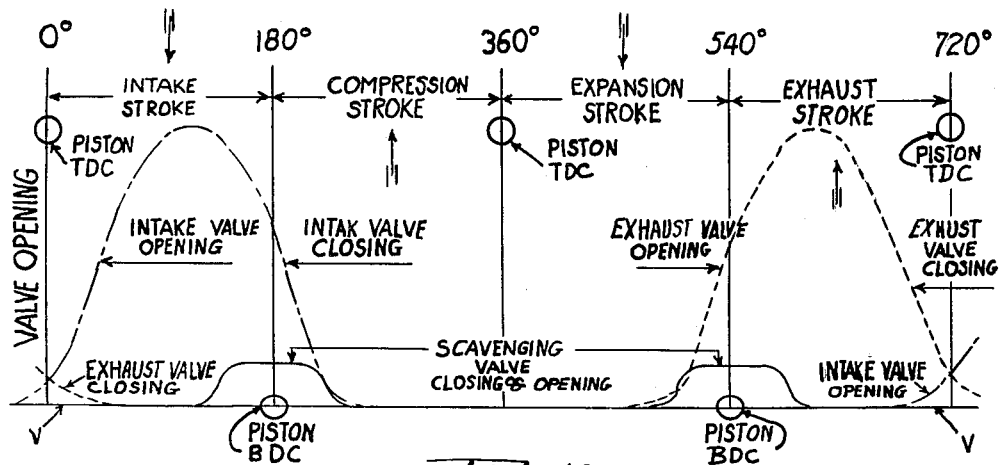
FIG. 10 is an engine valve operating diagram showing a preferred timing of the intake, exhaust and scavenging valves related to piston location and crankshaft rotation through the four cycles of operation of a four-cycle engine.

The particular embodiment of the invention disclosed herein is illustrated in connection with a single cylinder four-cycle engine for the purpose of clarity and simplicity. It is obvious that the invention is equally applicable to multi-cylinder four-cycle engines.

The four-cycle internal combustion engine is shown in FIG. 1 as having a cylinder block 10 including a cylinder 100 having a cylinder bore 11 therein, and a cylinder head 12. A piston 13 is reciprocatingly mounted in the cylinder bore 11 and is connected by a connecting rod 130 to the usual crankshaft, not shown. The cylinder head 12 is provided with an intake passage 14 having a port 15 opening into the cylinder bore 11, and controlled by an intake valve 16. The said cylinder head also has an exhaust passage 17 having a port 18 opening into the cylinder bore 11, and controlled by an exhaust valve 19. The intake and exhaust valves are operated in the conventional manner by cam shaft mounted cams, the cam shaft being driven by the engine crankshaft. Inasmuch as this construction is well known in the art, it need not be described or shown in the drawings. However, the timing of the opening and closing of the intake and exhaust valves will be described later. A carburetor 20 having a throat 201 including a throttle valve 21 therein is connected to the intake passage 14 by a manifold 22 for supplying an air-fuel mixture to the combustion chamber 23 above the piston 13. An air filter 24 is preferably provided for cleaning air admitted to the carburetor. The usual spark plug employed to ignite the air-fuel mixture in the combustion chamber is indicated at 25.

At one side of the cylinder block 10 there is provided a rotary scavenging valve 26, the housing 260 thereof having a bore 27 therethrough for receiving a hollow cylindrical rotatable scavenging valve member 28; the scavenging valve 26 and its housing 260 being shown in detail in FIG. 6. The cylinder wall 100 has a scavenging aperture 29 therethrough communicating between the rotary scavenging valve bore 27 and the cylinder bore 11 which is preferably at a point on the cylinder bore 11 slightly above the top of the engine piston 13 when the said piston is at its bottom dead center position. It is preferable that the direction and location of the scavenging valve port 29 may be such as to cause a swirling movement of scavenging air in the cylinder 11 so as to substantially stratify the scavenging air introduced in the said cylinder 11 and establish a substantial layer of scavenging air on top of the piston 13. The rotatable scavenging valve member 28 has an aperture 30 in its wall at a location for axial alignment with the said scavenging aperture 29 in the cylinder wall 100 when the rotary scavenging valve member 28 is in one position of its rotation. The rotary scavenging valve member 28 is further provided with other apertures 31 through the wall thereof shown spaced axially from the scavenging aperture 30 for admitting air from a scavenging air chamber 32 into the said hollow scavenging valve member 28 and through the scavenging apertures 30 and 29 when the latter apertures are aligned.

Air is conducted to the scavenging air chamber 32 of the rotary scavenging valve member 28 through a conduit 33 leading from the air filter 24. The rotatable scavenging valve member 28 is controlled by a lever 34 which is fixed to a projection 35 therefrom extending through the scavenging valve housing 260. The outer end of the said lever 34 is moved by a link 36 connected to the outer end of a lever 37 which controls the throttle valve 21 through a rod 370 connected to the usual accelerator pedal, not shown. In the embodiment of the invention shown in FIG. 1, the scavenging of the engine is controlled solely responsive to engine carburetor throttle movement.

In the form of the scavenging valve control shown in FIG. 2, the scavenging valve 26 is controlled solely by the pressure (depression) in the engine intake manifold 22. A pressure motor 38 operates the lever 34 attached by suitable linkage to the rotatable scavenging valve member 28. The pressure motor 38 comprises a rigid casing 39 forming with a flexible diaphragm member 41 a pressure motor chamber 40. The said flexible diaphragm member 41 is normally urged away from the casing 39 by a compression spring 42 for enlargement of the said pressure motor chamber 40. A link 43 is connected by suitable means between the outer end of the lever 34 and the central portion of the flexible diaphragm member 41. A conduit 44 connects the intake manifold 22 with the pressure motor chamber 40 and, when a suction exceeding the compression of the spring 42 exists in the said pressure motor chamber 40, the flexible diaphragm member 41 will force the lever 34 downwardly to close the scavenging aperture 30 in the scavenging valve 26 from the aperture 29 in the cylinder wall as shown in FIG. 3.

FIG. 4 illustrates a further form of scavenging valve control which operates on a combined manifold pressure and throttle movement. The pressure motor 38 is operated by the manifold pressure in the same manner as shown in FIGS. 2 and 3, but its expansion force is transmitted to a fulcrum link 430 having its opposite ends connected to the flexible diaphragm member 41 of the pressure motor 38 and a link 43 which is attached to the lever 37 of the throttle valve 21. The mid-portion of the fulcrum link 430 is pivotally connected to a link 43 which is in turn pivotally connected to the scavenging valve operating lever 34.

Referring now to FIG. 5, the engine piston 13 is provided with compression rings 45 in its upper head portion and an oil scraper ring 46 is positioned on the piston so as to be located just below the scavenging aperture 29 in the cylinder wall 100 when the piston is located at its top dead center position. By this arrangement, oil splashed on the cylinder wall below the engine piston 13 is scraped and returned to the crankcase thereby preventing oil seepage into the scavenging aperture 29.

The exhaust gases through the engine exhaust passage 17 are preferably directed into an extended engine tubular exhaust pipe 47 through which the exhaust gases move at high speed. The flow of exhaust gases passing through the exhaust pipe 47 at the early stage of the opening of the exhaust valve 19 creates energy in the form of kinetic energy producing an exhaust pulse in the exhaust pipe which draws a fresh air charge into the combustion chamber through the scavenging aperture 29 when open by creating sub-atmospheric pressure in the cylinder 11.

Referring now to FIG. 7 there is illustrated a modified form of the invention wherein an air pressure operated valve 50 is employed to control the flow of fresh scavenging air to the cylinder 11 through the aperture 29 in the said cylinder 11. A boss 500 is formed on the outer surface of the cylinder block 10 to accommodate the said valve 50. A counterbore 51 is formed in the said boss 500 concentric with the scavenging aperture 29 in the cylinder wall 11. A conduit 33, leading from the air filter 24, is connected to a head portion 501 of the valve 50, which head portion 501 is telescopingly fixed in a counterbore 51 in the valve boss 500. The inner end of the said head 501 is provided with a counterbore 52 forming a valve chamber 53 between the passage 54 in valve head portion 501 and the aperture 29 in the cylinder 11 for the reception of a cruciform wafter check valve member 55, best shown in FIGS. 8 and 9.

The major diameter of the cruciform check valve member 55 is slightly smaller than the counterbore 52 forming the valve chamber 53 to permit free axial movement of the valve member 55 in the valve chamber 53 between the end faces 56 and 57 of the counterbores 51 and 52 respectively. The diameter of the central solid portion 58 of the valve member 55 is slightly larger than the opening 54 leading to the valve chamber 53 and smaller than the diameter of the aperture 29. Pressure from the cylinder 11 acting on said valve member 55 will close the opening 54. When the valve chamber 53 is subjected to sub-atmospheric conditions, as indicated by the depression waves W and WW in FIG. 11, the valve member 55 will be drawn against the end face 56 of the valve chamber 53 having the aperture 29 therein whereupon fresh air from the air filter 24 will pass around the solid portion 58 of the valve member 55 and through the aperture or passage 29 in the engine cylinder 11 into the combustion chamber 23. The length of the passage 29 is sufficiently long to provide an air cushion during the engine expansion stroke to insulate the valve member 55 from detrimental effects of the high temperature of the gases.

Referring now to the engine valve operating diagram shown in FIG. 10, the abscissa of the diagram indicates the intake, compression, expansion and exhaust strokes of the piston of the 4-cycle engine occurring sequentially during 720 degrees of crankshaft rotation. The top dead center, TDC, of the engine piston is at zero, 360 and 720 degrees of crankshaft rotation, and bottom dead center, BDC, of the engine piston is at 180 and 540 degrees of crankshaft rotation, as indicated at said points of crankshaft rotation. The ordinate of the diagram indicates the valve openings. The opening and closing of the engine intake valve is shown by dot and dash lines, the opening and closing of the engine exhaust valve is shown by dotted lines, and the opening and closing of the scavenging air valve is shown by full lines, all related to the valve-closed base line V—V.

Figure 11:
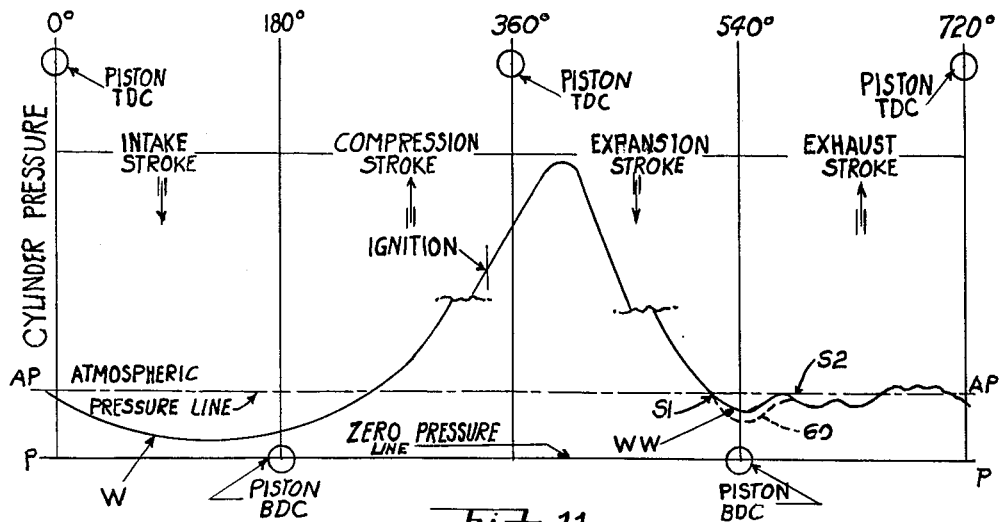
FIG. 11 is a cylinder pressure diagram showing the cylinder pressures related to absolute and atmospheric pressures occurring during the four cycles of operation of a four-cycle engine, the said FIG. 8 being disposed directly below FIG. 7 to admit of ready coordination of the cylinder pressures with the engine valve timing.

Directly below FIG. 10 and vertically aligned therewith is FIG. 11 showing a cylinder pressure diagram in which the abscissa of the diagram indicates the engine piston strokes and the crankshaft rotation as in FIG. 10. The ordinate in FIG. 11 shows the absolute cylinder pressure during the four piston strokes represented by a full line curve related to the zero absolute pressure base line P—P, the atmospheric pressure represented by a dot and dash line AP—AP paralleling the said base line PP.

In a 4-cycle engine such as disclosed in FIG. 1, as in a conventional engine, it is preferable that an air-fuel mixture from the carburetor be selected to produce as complete combustion as possible at normal speeds and loads which would be substantially free from unburned fuel, and, during the transient from idle to fast throttle opening, the fuel is increased and/or the air is decreased in the air-fuel mixture so as to preserve a correct air-fuel ratio in the cylinder for good combustion. The foregoing is accomplished by carburetor construction and carburetor controls in various ways well known in the carburetor art, and does not constitute a part of this invention.

In a conventional engine, at idle or near idle throttle with the engine coasting (i.e. when the throttle is practically closed and the engine is being driven by its connected load at a greater r.p.m. than it would run under idle throttle, and the intake system of the engine is below atomsheric pressure) the engine exhausts large amounts of carbon monoxide and hydrocarbons. This phenomenon is due to the introduction of rather small fresh charges of air-fuel mixture in relation to the large amount of residual exhaust in the cylinder. It is well known that the foregoing condition of conventional engine operation retards combustion and requires that the air-fuel mixture at idle or near idle throttle with the engine coasting delivered by the carburetor be rich, or stated in another manner, that the amount of fuel mixed by the carburetor with air under such engine operation be greatly in excess of the stoichiometric value.

In the instant invention, at idle, near idle and coasting, combustion is greatly improved by replacing part of the residual exhaust normally remaining in the cylinder by the introduction of scavenging air therein near the end of the intake stroke and the begining of the compression stroke of the piston, and near the end of the expansion stroke and the beginning of the exhaust stroke of the piston so that residual gases in the combustion chamber at the beginning of the intake stroke are substantially replaced with air whereby a more complete combustion of the incoming air-fuel mixture than otherwise will take place when the air-fuel mix is ignited substantially at the end of the compression stroke.

The valve operation indicated in FIG. 10 occurring during the four cycles of a 4-cycle engine embodying the invention is for illustrative purposes only, and pertains to a specific engine design, it being understood that the precise points of valve openings and closings may be varied as required by characteristics of other engine designs, such as piston stroke, piston bore, valve sizes, lengths of the exhaust pipe, exhaust resistance to flow, and the like.

By reference to FIG. 11 it will be noted that as the piston moves downwardly from TDC (top dead center) during the intake stroke, and, as the piston moves upwardly from BDC (bottom dead center) during the first portion of crankshaft rotation of its compression stroke, a sub-atmospheric pressure W exists in the engine cylinder. Ignition preferably occurs before TDC near the end of the compression stroke. The maximum cylinder pressure occurs after the beginning of the expansion stroke. It also should be noted that a sub-atmospheric pressure occurs in the engine cylinder near the end of the expansion stroke and/or near the beginning of the exhaust stroke. And finally, an above atmospheric pressure generally exists in the engine cylinder toward the end of the exhaust stroke.

In a 4-cycle engine it is preferable that the carburetor be set at an air-fuel mixture to produce as complete combustion as possible for engine operation at normal speeds and loads. During the transient of fast throttle opening, the fuel is increased and/or the air is decreased in the air-fuel mixture supplied by the carburetor to the engine. With proper carburetion, in neither of these situations is there a harmful excess of carbon monoxide and hydrocarbons in the exhaust gases. However, at idle or near idle throttle or with the engine coasting, the engine exhausts large amounts of carbon monoxide and hydrocarbons in its exhaust gases. It is this latter situation that the improved scavening method and means of this invention corrects by preventing an accumulation of unburned gases and air-fuel mixture in the cylinder.

By extending or lengthening the exhaust pipe from the exhaust port up to an optimum length, the degree of sub-atmospheric pressure WW normally occurring near the latter portion of the expansion stroke and/or near the early portion of the exhaust stroke can be increased generally as indicated by the dotted line 60 in the cylinder pressure diagram FIG. 11. The normal kinetic energy of the exhaust gases leaving the cylinder, due to employment of an exhaust pipe from the exhaust port, (a) overcomes friction in the exhaust pipe, and (b) overcomes back pressure in the down stream side of the exhaust system.

Referring now to FIG. 2, alternately, the scavenging valve 26 may be opened at such times as a pressure motor 38 linked thereto senses engine intake manifold depression through a connecting conduit 44 extending between the pressure motor chamber 40 and the said engine intake manifold 22. The pressure motor 38 is normally spring loaded by a compression spring 42 to close the scavenging valve 26; however, when sufficient depression exists in the pressure motor chamber 40, the spring 42 becomes compressed until the cup 410 thereof moves with the diaphragm 41 to a position at rest against the rigid pressure motor casing 39. The compressed load of the compression spring 42 and its spring rate is so established that when the vacuum in the pressure motor chamber 40 decreases below a selected value, the scavenging valve 26 is fully closed as shown in FIG. 3.

As shown in FIG. 4, the controls of FIG. 1 and FIG. 2 are incorporated into an engine embodying the invention so that combined throttle and manifold pressure (depression) control over the scavenging valve 26 is obtained.

In practicing the invention, it is preferable that the carburetor adjustment be relatively lean when the engine is operating at near wide open throttle at normal engine loads whereby to prevent or substantially prevent formation of carbon monoxide and free hydrocarbons in the engine exhaust.

Although but a single embodiment of the invention and three modifications thereof have been disclosed and described herein, it is obvious that many changes may be made in the structure and method disclosed herein without departing from the spirit and scope of the invention as defined by the appended claims.

I claim:

1. In a four-cycle internal combustion engine, a cylinder including a head forming a combustion chamber, a piston reciprocable in said cylinder, intake and exhaust passages to and from said combustion chamber, intake and exhaust valves for opening and closing said passages, a carburetor having a throat leading to said intake passage, a butterfly throttle valve in said carburetor throat and control means therefor, a scavenging port in the wall of said cylinder located to communicate with said combustion chamber only when said piston approaches its bottom dead center position, scavenging valve means opening and closing said scavenging port for admitting a flow of scavenging air to said combustion chamber, and a linkage between the said throttle valve control means and said scavenging valve whereby when said throttle valve is at its idle or near idle position the scavenging valve means is open, and means operable responsive to the pressures in said intake passage modifying the action of the linkage between the said throttle valve control means and said scavenging valve.

2. In a four-cycle internal combustion engine, a cylinder including a head forming a combustion chamber, a piston reciprocable in said cylinder, intake and exhaust passages to and from said combustion chamber, intake and exhaust valves for opening and closing said passages, the wall of said cylinder having a scavenging port therein normally closed by said piston located to communicate with said combustion chamber only when said piston is near its bottom dead center position, and scavenging valve means opening and closing said scavenging port for controlling flow of scavenging air to said combustion chamber, means operable responsive to movement of said throttle valve for controlling the opening and closing of said scavenging valve, and means operable responsive to pressure in said intake passage for modifying the said throttle valve control of said scavenging valve.

References Cited in the file of this patent

UNITED STATES PATENTS

| | | |
|---|---|---|
| 1,224,151 | Dempsey | May 1, 1917 |
| 1,534,153 | Bax | Apr. 21, 1925 |
| 1,580,420 | Dempsey | Apr. 13, 1926 |
| 1,783,075 | Eisenburger | Nov. 25, 1930 |
| 1,892,124 | Abell | Dec. 27, 1932 |
| 2,159,989 | Hazen et al. | May 30, 1939 |
| 2,305,306 | Riccardi | Dec. 15, 1942 |
| 2,717,583 | Maybach et al. | Sept. 13, 1955 |
| 2,789,547 | Mallory | Apr. 23, 1957 |
| 2,807,250 | Mallory | Sept. 24, 1957 |